J. J. BATE.
Refrigerator.
No. 222,173.  Patented Dec. 2, 1879.
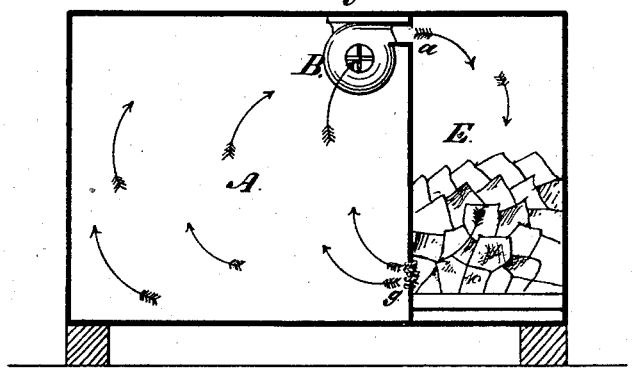
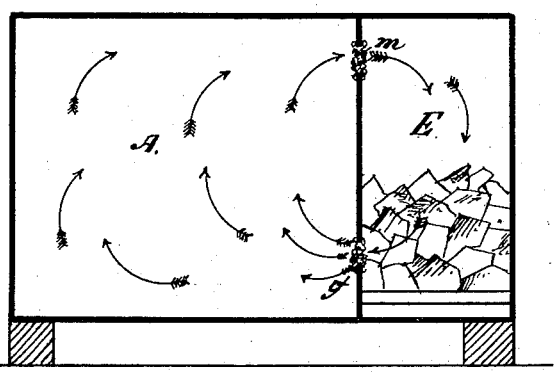

UNITED STATES PATENT OFFICE.

JOHN J. BATE, OF BROOKLYN, NEW YORK.

IMPROVEMENT IN REFRIGERATORS.

Specification forming part of Letters Patent No. 222,173, dated December 2, 1879; application filed December 13, 1876.

*To all whom it may concern:*

Be it known that I, JOHN J. BATE, of the city of Brooklyn, in the county of Kings and State of New York, have invented certain Improvements in Refrigerators for Preserving Meats During Transportation and Storage, of which the following is a specification.

This invention relates to that class of apparatus designed for the preservation of meats, fruits, vegetables, &c., by retaining the same at a temperature below that at which decomposition ordinarily occurs; but, as hitherto constructed and operated, such refrigerators, while in the main efficient, have been defective in this, that in the preservation of meats the outer surface of the meat has been liable to be brought to a condition more or less approaching incipient decay, thereby impairing the delicacy of its flavor, and also destroying the crisp and fresh appearance of the surface, or, as it is termed by butchers, the "bloom," upon which in a great measure the highest market value of the meat depends. My invention is designed to obviate this drawback to the most successful use of refrigerators for the transportation and storage of meats, and is based upon the scientific fact that by some natural law, the true nature of which is not clearly understood, fibrous or woven materials, such, for example, as what is known as "burlaps," possess the power of abstracting or absorbing from atmospheric air the germs or molecules by which incipient decomposition is provoked in meats; and my said invention consists in a refrigerator constructed with one or more germ-absorbers, composed of burlaps or other suitable fibrous or woven material, through which the cooled air circulated in contact with the surface of the meat is caused to pass, the hurtful germs or external sources of decay being thus eliminated from the air before it comes in contact with the meats which it is designed to preserve.

It is to be understood in this connection that the germ-absorbent of fibrous or woven material is used in contradistinction to masses of charcoal or like substance through which the air has been hitherto passed in certain refrigerators, but in which such charcoal or like material has proved practically worthless in accomplishing the objects sought.

Figure 1 represents a refrigerator constructed in accordance with my said invention, and Fig. 2 illustrates another form or modification thereof.

The construction of the refrigerator itself may be varied within wide limits, so long as its operation involves the circulation either to or within it of air cooled to the temperature usually adopted for the preservation of meats, &c.; and I do not limit myself in this respect to the employment of either or all of the parts represented in the drawings hereinbefore referred to, said drawings illustrating those modifications of my invention which I consider the most useful, but not all those which may be adopted.

In Fig. 1, the chill-room A is closed against access of external air, and is provided with a fan-blower, B, the inlet of which opens to the chill-room A, the outlet of which opens into an ice-box, E, the bottom of which latter has an opening, $g$, the operation of the fan drawing the air from the top of the chill-room, forcing it into the ice-box, down through the latter in contact with ice, which cools it, and thence out through the opening $g$ to the bottom of the chill-room, the air being thus circulated continuously within the latter. In this case the germ-absorbent—in other words, the burlaps or other fibrous or woven material—is placed across the outlet $g$, so that the air continually passing through said germ-absorbent or material has the germs of decay absorbed and retained by said material, so that as the air comes in contact with the meat placed in the chill-room A it is rendered perfectly innocuous and incapable of inciting that incipient decomposition by which ordinarily the flavor of the surface of the meat, and also the bloom thereof, is destroyed.

Instead of employing a circulation of air produced by the forcing action of a fan, B, or the like, reliance may be had simply upon the increased density of the air passing in through an opening, $m$, at the top of the ice-box, thence in contact with the ice in the ice-box E, and back to the chill-room through the outlet $g$, the latter covered, as in Fig. 1, with the germ-absorbent or fibrous or woven material. As the air comes in contact with the ice it is cooled, rendered heavier, caused to descend, and as it passes out to the chill-room A it forces upward the less-refrigerated air and insures its passage, through the opening $m$, back to the ice-box, a continuous circulation of air being thus produced; and inasmuch as the outlet $g$ is provided in this case, as in Fig. 1, with the absorbent material, it follows that the continuous passage of the air through the germ-absorbing material causes the germs to be absorbed by said material, so that the air in this, as in the previous instance, is enabled to come in contact with the meat without communicating thereto the germs which destroy the quality of its surface, as hereinbefore fully set forth.

I do not limit myself to any special construction of refrigerator, nor to any particular texture of germ-absorbing or fibrous or woven material, so long as said fibrous or woven germ-absorbing material performs the functions herein explained in substantially the manner herein set forth.

It is to be understood, however, that I do not claim the use of charcoal as a filter through which the air shall be passed, such use of charcoal having been known before my invention, and being not only ineffectual, but different in every respect from my said invention. It is manifest that a receiving or delivery conduit might be connected with the air-passages of this refrigerator, for the purpose of receiving or delivering the air at a point distant from the chamber containing cooling material; but What I do claim as my invention is—

1. In combination with the provision-chamber of a refrigerating apparatus, a chamber containing cooling material, separated therefrom by a partition containing an inlet and an outlet air-passage, one or both of such passages being provided with an air-filter or filtering-diaphragm of fibrous or fibrous woven material, for the purpose of straining or filtering from the air the spores or germs which produce decay, substantially as described.

2. In combination with the provision-chamber of a refrigerating apparatus, a chamber containing cooling material, separated therefrom by a partition containing an inlet and an outlet air-passage, one or both of such passages being provided with an air-filter or filtering-diaphragm of fibrous or fibrous woven material, for the purpose of straining or filtering from the air the spores or germs which produce decay, the air which passes through the chamber containing cooling material being forced to circulate by means of a fan, for the purpose of insuring circulation through the filtering diaphragm or diaphragms, substantially as described.

3. In a refrigerator closed to the external air, the combination of a fan-blower, a chamber containing cooling material, and a filtering-diaphragm of fibrous or fibrous woven material, for the purpose of insuring continuous circulation of chilled and purified air, substantially as described.

JOHN J. BATE.

Witnesses:
EDWARD HOLLY,
H. WELLS, Jr.